Jan. 9, 1940.  N. C. PRICE  2,186,344
OIL-AIR SEPARATOR
Filed April 2, 1938
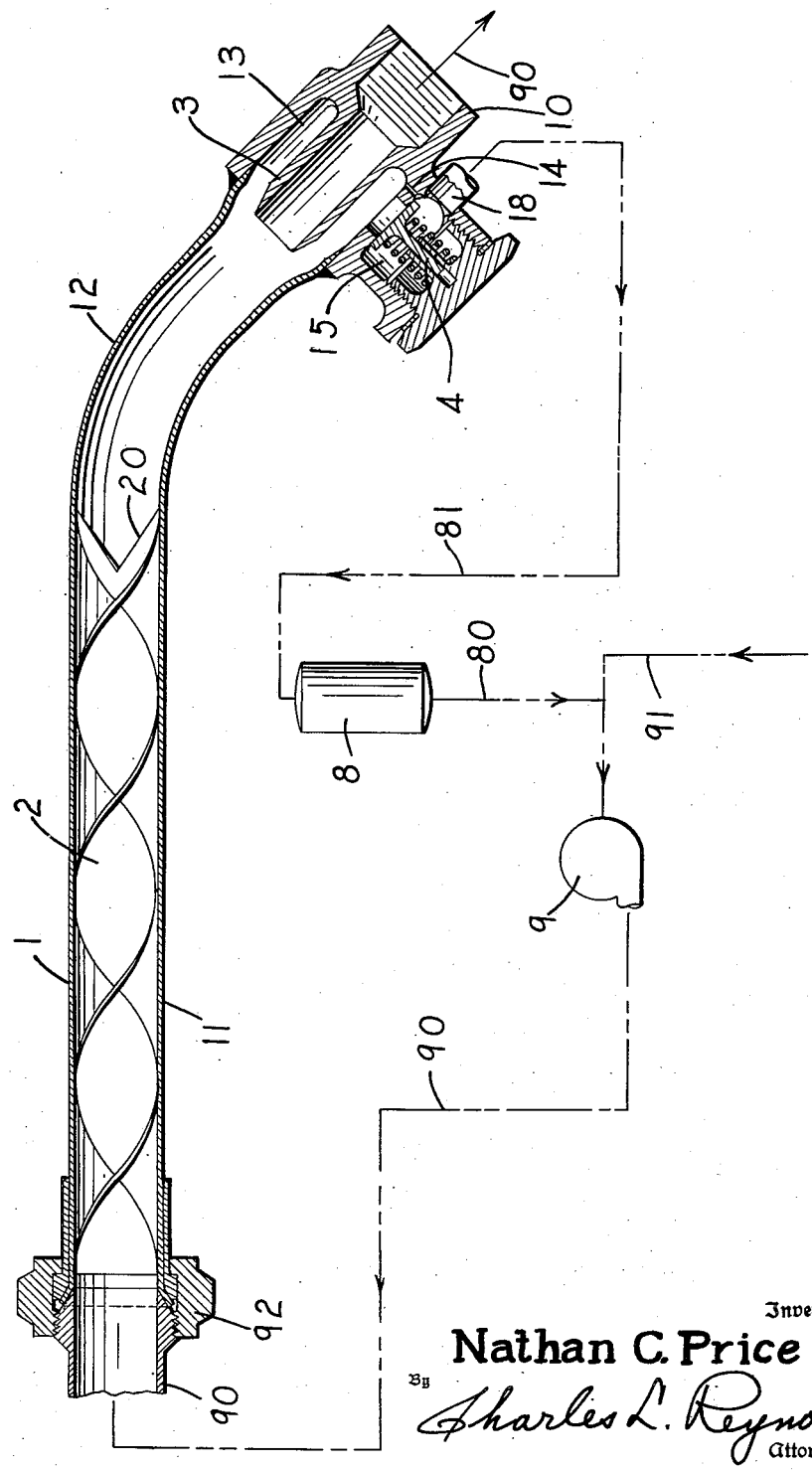
Inventor
Nathan C. Price
By Charles L. Reynolds
Attorney Patented Jan. 9, 1940

2,186,344

UNITED STATES PATENT OFFICE 2,186,344

OIL-AIR SEPARATOR

Nathan C. Price, Seattle, Wash., assignor to Boeing Aircraft Company, Seattle, Wash., a corporation of Washington Application April 2, 1938, Serial No. 199,690

5 Claims. (Cl. 183—80)

Air pressure is employed, as also suction, for various uses upon airplanes. Such pressure, positive or negative, is sometimes produced by pressure or vacuum pumps. Oil is sometimes admitted to such air streams purposely, for the purpose of lubricating the pump, for instance. However, the presence of oil at the instrumentality where the air pressure is employed may be detrimental. As an example, pulsating air pressure is employed to inflate and deflate the rubber boots which are used as deicing equipment, upon many planes. The air for this purpose is supplied from a pressure pump, and to lubricate this pump it is the practice to admit oil in small quantities to the air stream, or, whether or not it is admitted, it may be picked up at the pump and carried beyond the pump by the air flow. Since the deicer boots are of rubber, and rubber is harmfully affected by oil, it is extremely desirable to eliminate the oil from the air intended for such use, and to effect 100% elimination if possible.

Accordingly it is an object of the present invention to provide a separator whereby the entrained oil may be separated from an air stream to the maximum degree, approaching or achieving 100% elimination of oil. By the accomplishment of this object there is accomplished the further object that the deicing equipment is protected against oil deterioration to the highest degree and for the longest time.

It is a further object to provide such a separator which can be incorporated as an integral part of a pressure line, and which will create little or substantially no back pressure or decrease of pressure, which is simple to construct, which has no working parts to get out of order, and which is inexpensive.

For use upon airplanes and the like it is also an object to provide such a separator which is not dependent upon gravitational effects, and which is not affected by variations in the atmospheric pressure, nor one which is affected by changes in temperature.

With these and other objects in mind, as will appear hereafter, my invention comprises the novel separator and the novel parts and relative arrangement thereof, as shown in the accompanying drawing, and as will be described in this specification and more particularly defined by the claims which terminate the same.

In the accompanying drawing I have shown my invention in a typical form of construction, arranged diagrammatically with suitable apparatus, without restriction, however, as to the details of the system in which it may be incorporated.

The figure shows the separator in axial section, and diagrammatically shows a typical system in association therewith.

Such a system may embody a pump 9, a pressure line 90, and if the pump is also to produce negative pressure it may embody a suction line 91. Oil may be supplied from a supply tank 8 through a line 80, and thence is delivered either directly to the pump or to the suction line 91, and if the separated oil is to be reused, it may be led back to the tank 8 by a return line 81.

The separator is incorporated in the pressure line 90 in this instance, although it might also be incorporated in a suction line. A tube 1 is coupled at 92, at its feed end, in the pressure line 90, and is formed at its discharge end, as indicated at 10, for connection again in the pressure line 90. It may be fitted at 18 to be connected to the oil discharge or return line 81. This tube 1 is preferably formed of light tubing, for instance of aluminum alloy, and incorporates a straight portion 11, adjacent its feed end, and a curved portion 12 intermediate the straight portion 11 and its discharge end 10. The curvature of the portion 12 need not be abrupt, but should be sufficient in angular extent to displace its discharge end 10 out of alignment with the straight portion 11. The purpose of this will appear shortly.

Adjacent its feed end, for instance within the straight portion 11, are provided means to effect a swirling movement of the material passing through the tube. This might be accomplished in various ways, but is simply accomplished by providing a flat helically twisted plate 2, which fills the interior of the straight portion 11, yet which has a high pitch and hence produces but little resistance or pressure drop. This flat helix starts the air and any entrained oil into rotational or swirling movement as it passes through the tube 11, and the oil, having greater specific mass than the air, is thrown centrifugally to the walls of the tube 1, and follows this wall in a film or body which tends to hub the wall, following it lengthwise and rotating helically. The wall of the tube, with this film of oil hugging it, forms and defines a hollow shell, down which the core of air passes. The centrifugally swirling film of oil follows the curve 12, still hugging the wall of the tube, and at the discharge end of the tube a nozzle 3 projects into the core of air, and serves as a means of escape therefor. The oil collects in a somewhat enlarged cavity 13, whence it escapes by means of a bleed hole 14, into a chamber 15, and thence is led away by the fitting 18. In the design shown, a poppet valve 4 is provided, whereby to enable escape of air pressure, should the pressure within the tube exceed the predetermined maximum for which the spring of the valve 4 is set. This in itself forms no part of this invention.

Such separators are known, with the exception of the curved portion 12, and they operate reasonably well. However, I have discovered that there is a tendency for oil droplets to tend to follow down the axis of the axial core of air in the straight portion 11, and to pass out of the aligned air discharge nozzle 3, without being separated. It may be that the center of the swirling air core is somewhat more rarefied than its outer portion, and that the oil droplets in the center of the air core are less affected by the air, and by the centrifugal effect; certain it is that they tend to follow a straight line path coaxial with the straight portion 11. By providing the curved portion 12, of the extent shown and described, the straight axial core, if prolonged, would miss the air escape nozzle 3 completely, and the oil droplets, which have some mass, tend to follow in a straight line rather than to follow the curvature 12, and these droplets therefore impinge and are absorbed by the oil film which still follows centrifugally around the curve 12, hugging the walls of the tube about this curve. These droplets are therefore eliminated from the axial core, the form of which follows the curve, and by this means are substantially completely eliminated.

To further assist in the elimination of these droplets, some of which tend to deposit upon the helical plate 2, or are of such small mass that they remain suspended in the air, the discharge end of the plate is rather deeply notched, as indicated at 20, from its center toward each edge, the notch sloping outwardly and forwardly in the direction of movement of the material through the tube. This notch is preferably located adjacent the commencement of the curved portion 12. Its function is to provide inclined terminal edges along which deposited oil will follow, being thereby guided outwardly and forwardly, until again they are caused to mingle with the oil film which clings to the walls of the tube, and these droplets, tending to deposit upon the helix 2, are thereby intercepted and again caused to mingle with the main body of the oil. This further frees the oil from droplets. The notch thus constituted is further and particularly effective since, notwithstanding the thinness of the plate 2, the terminal edges of the notch constitute eddy-forming edges, when the air is following the axial core through the tube, and these eddies, caused by the air in motion, and particularly by the air in helical motion, further serve to deposit the still suspended droplets, and to move the deposited droplets down the guiding inclined terminal edges of the notch 20.

The arrangement thus shown and described is particularly advantageous in that the air, which might otherwise serve as a vehicle still to carry the droplets around the curve, in this instance acts to deposit the entrained oil droplets and to assist in guiding them along the sloping edges of the notch into contact with the oil film, and those droplets which still have sufficient mass that they are not deposited, but tend to follow in prolongation of the axial core, are of sufficient mass that they will impinge the curved portion of the oil film, and will be absorbed thereby. It follows, and it has been found in practice, that such a separator, without any appreciable change of pressure or production of back pressure, will accomplish separation of the oil from the air to a degree approaching 100% of perfection, and departing therefrom, if at all, only by fractions of a per cent. As a result the air, free of oil, may operate whatever instrumentalities it is designed to operate, such as a deicer, and without any possibility of deterioration of the deicer or other instrumentality, and without any possibility of error, for instance in a pressure instrument, due to the presence of oil in the air.

What I claim as my invention is:

1. A device to separate air from liquid, comprising a tube adapted to be connected in an air pressure line, means adjacent its feed end to direct the liquid-laden air centrifugally adjacent its walls, an air discharge nozzle at its discharge end spaced inwardly from its walls, liquid discharge means at its discharge end, the tube between its ends following a curve, the extent of the curvature and the length of the nozzle, within the tube, being such that prolongation of lines through the feed end of the tube, parallel to its axis, will miss the entrance of the nozzle.

2. A device to separate air from entrained liquid, comprising a tube adapted to be connected in an air pressure line and having a straight feed end, said tube being curved intermediate such straight portion and its discharge end, means adjacent its feed end to direct the liquid-laden air centrifugally adjacent its walls, in a helical path, an air discharge nozzle at its discharge end disposed axially within the tube, but out of alignment with the straight feed end of the tube, and liquid discharge means disposed about such nozzle, at the discharge end of the tube.

3. A device to separate air from entrained liquid, comprising a tube adapted to be connected in an air pressure line, and having a straight feed end, said tube being curved intermediate such straight portion and its discharge end, means within its straight portion to direct the liquid-laden air centrifugally into contact with its walls, whereby the liquid is disposed as a film traveling along its walls, an air discharge nozzle at the discharge end of the tube, projecting within the tube, with its entrance directed towards the feed end, but around the curve from and out of alignment with the straight portion, and liquid discharge means disposed adjacent such nozzle, at the discharge end of the tube.

4. A device to separate air from liquid, comprising a tube adapted to be connected in an air pressure line, an helically arranged flat strip disposed within its feed end, to direct the liquid-laden air centrifugally adjacent its walls, an air discharge nozzle at the discharge end of the tube, projecting axially within the tube, liquid discharge means disposed adjacent such nozzle, at the discharge end of the tube, the end of said helical strip which is towards the nozzle being notched to form terminal edges sloping outwardly and in the direction of flow of the air and liquid, from its center to the walls of the tube, to guide liquid droplets outwardly to the tube's wall.

5. A device to separate air from entrained liquid, comprising a tube having a straight feed end, and adapted to be connected in an air pressure line, said tube being curved intermediate such straight portion and its discharge end, an helically arranged flat strip disposed within its straight portion, to direct the liquid-laden air centrifugally adjacent its walls, an air discharge nozzle at the discharge end of the tube, spaced inwardly from the walls of the tube, but disposed around the curve from and out of alignment with the straight portion, and liquid discharge means disposed adjacent such nozzle at the discharge end of the tube, the discharge end of the helical strip being notched from an apex at its center to each edge, to form terminal edges sloping outwardly from such apex and in the direction of flow of the air and liquid.

NATHAN C. PRICE.